United States Patent
Hamada (10) Patent No.: US 8,176,393 B2
(45) Date of Patent: May 8, 2012

(54) ENCODING DEVICE FOR ERROR CORRECTION, ENCODING METHOD FOR ERROR CORRECTION AND ENCODING PROGRAM FOR ERROR CORRECTION

(75) Inventor: Mitsuru Hamada, Kawasaki (JP)

(73) Assignee: Tamagawa K-12 & University (JP)

( * ) Notice: Subject to any disclaimer, the term of this patent is extended or adjusted under 35 U.S.C. 154(b) by 1251 days.

(21) Appl. No.: 11/898,261

(22) Filed: Sep. 11, 2007

(65) Prior Publication Data

US 2008/0063188 A1 Mar. 13, 2008

(30) Foreign Application Priority Data

Sep. 12, 2006 (JP) .................. 2006-247207
Jul. 23, 2007 (JP) .................. 2007-190498

(51) Int. Cl.
  *H04M 13/00* (2006.01)
(52) U.S. Cl. ...................... 714/781; 714/786
(58) Field of Classification Search .............. 714/746, 714/755, 781–784, 786
  See application file for complete search history.

(56) References Cited

U.S. PATENT DOCUMENTS

| 5,517,510 A | * | 5/1996 | Kuban et al. | .......... 714/783 |
| 7,243,292 B1 | * | 7/2007 | Naslund et al. | .......... 714/781 |

FOREIGN PATENT DOCUMENTS

| JP | 06-077844 | 3/1994 |
| JP | 3281938 | 3/2002 |
| JP | 2001127752 A | 11/2002 |
| JP | 2001005382 A1 | 1/2003 |
| JP | 2005072650 A | 3/2005 |
| JP | 2005-110251 | 4/2005 |

OTHER PUBLICATIONS

Shiguo Lian; Zhiquan Wang; Jinsheng Sun; , "A fast video encryption scheme suitable for network applications," Communications, Circuits and Systems, 2004. ICCCAS 2004. 2004 International Conference on , vol. 1, no., pp. 566-570 vol. 1, Jun. 27-29, 2004 doi: 10.1109/ICCCAS.2004.1346195.*

Shuiming Ye; Qibin Sun; Ee-Chien Chang; , "Error resilient content-based image authentication over wireless channel," Circuits and Systems, 2005. ISCAS 2005. IEEE International Symposium on , vol., no., pp. 2707-2710 vol. 3, May 23-26, 2005 doi: 10.1109/ISCAS.2005.1465185.*

(Continued)

*Primary Examiner* — Cynthia Britt
(74) *Attorney, Agent, or Firm* — Blank Rome LLP (57) ABSTRACT

The present invention aims at providing an encoding device for error correction, encoding method for error correction and encoding program for error correction wherein countermeasures against eavesdropping are taken into account. To achieve this, in accordance with an aspect of the present invention there is provided an encoding device for error correction, the device comprises a generation means for generating randomly a vector $u=(x_{k+1}, \ldots, x_m)$ composed of m-k digit(s); a creation means for creating an $x'=[xu]=(x_1, \ldots, x_m)$ by concatenating the vector $u=(x_{k+1}, \ldots, x_m)$ composed of m-k digit(s) randomly created by the creation means to data $x=(x_1, \ldots, x_k)$ to send; and an output means for outputting a vector of length n by carrying out [n, m] encoding of the x' created by the creation means.

6 Claims, 3 Drawing Sheets

OTHER PUBLICATIONS

Alencar, F.M.R.; Leo, A.M.P.; de Souza, R.M.C.; , "Private-Key Burst Correcting Code Encryption," Information Theory, 1993. Proceedings. 1993 IEEE International Symposium on , vol., no., pp. 227, Jan. 17-22, 1993 doi: 10.1109/ISIT.1993.748541.*

Stephen B. Wicker, "Error Control Systems for Digital Communication and Storage," Prentice Hall, 1995 Chapter 8 pp. 175-202.*

F.J. Williams and N.J.A. Sloane, "The Theory of Error-Correcting Codes," North-Holland, pp. 2-3, 22-25, 200-203 and 338-345, 1978.

* cited by examiner

PRIOR ART

ENCODING DEVICE FOR ERROR CORRECTION, ENCODING METHOD FOR ERROR CORRECTION AND ENCODING PROGRAM FOR ERROR CORRECTION

CROSS-REFERENCE TO RELATED APPLICATIONS

This application is based upon and claims the benefit of Japanese Patent Application No. 2006-247207 filed on Sep. 12, 2006 and Japanese Patent Application No. 2007-190498 filed on Jul. 23, 2007 of which the entire contents are incorporated herein by reference.

BACKGROUND OF THE INVENTION

1. Field of the Invention

The present invention relates to an encoding device for error correction, encoding method for error correction and encoding program for error correction, and more specifically to an encoding device for error correction, encoding method for error correction and encoding program for error correction based on redundancy in data representation.

2. Description of Related Art

Today, the art of the Error-Correcting Codes for correcting errors occurring in communication channels are utilized in the field of all digital communications. Here, although the term of "communication" generally means information transmission between distanced points carried out via communication media, such as a cable or radio, it is not limited to such a narrow meaning in this specification. The concept of "communication" also includes, for example, recording information on a recording medium such as a compact disc in this specification. Sending information is carrying information to a distant place, and recording information is carrying information to a distant (later) time so that one can read it out later, therefore these are same in that both carry information.

What is handled by coding theory is digitized information. The data to send may be what was digitized from audio signals, video signals, etc., or digital data, etc., from a computer. The words "information source" are used to include a generation source of this information, a part which digitizes them, and any other related parts. In many cases, digitized information (data to send) is expressed in bit strings by using two kinds of signs (numbers), 0 and 1, which can be understood if you think of Pulse-Code Modulation (PCM) signals for example. For this reason, also in this specification, data to send shall be expressed in bit strings or more generally in digit sequences.

Figure 3:
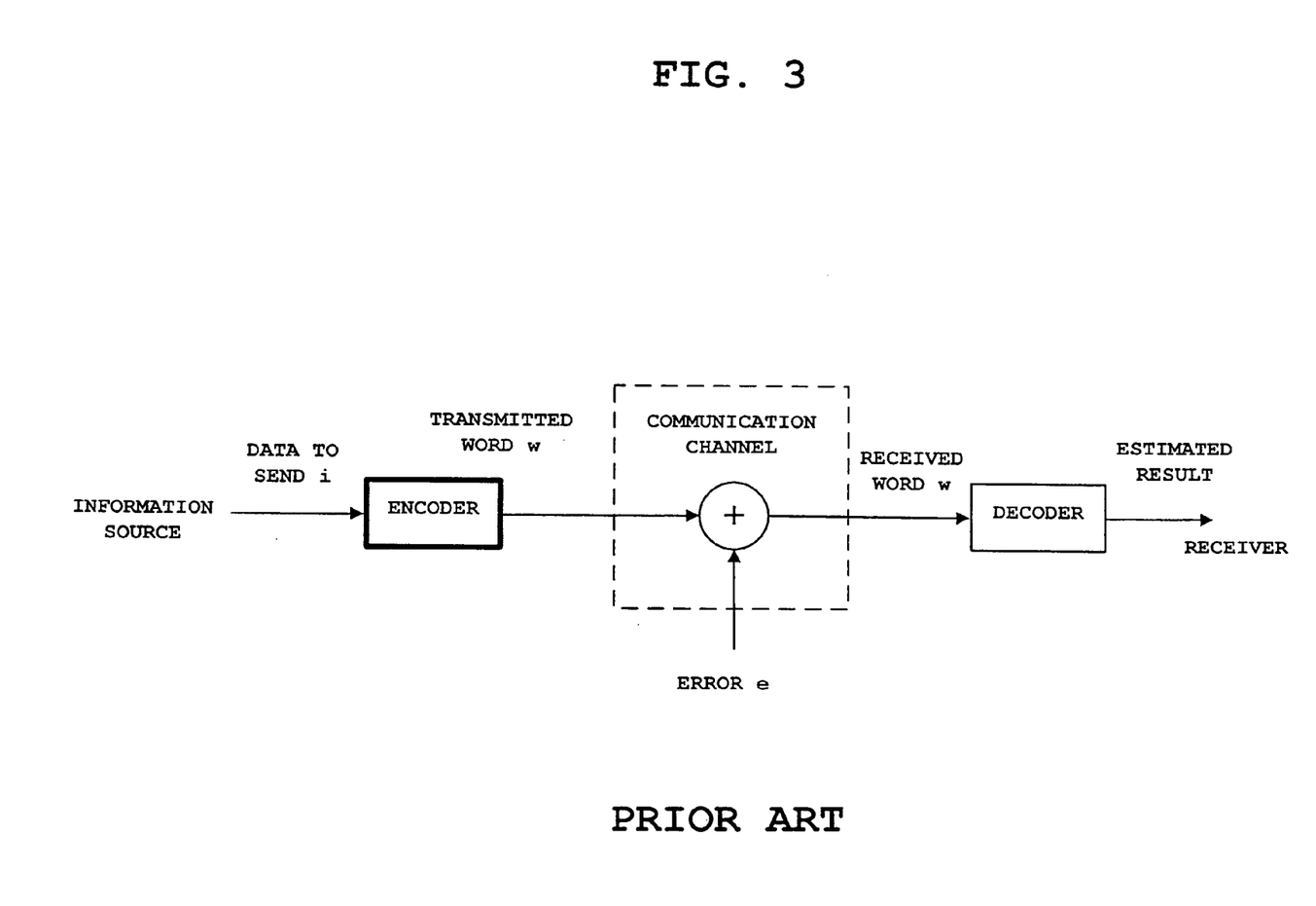
FIG. 3 shows a model of a conventional prior art communication system.

FIG. 3 shows a model of a communication system. In this figure, a bit string (information bit string) of 0 and 1 is generated as data to send from an information source. An encoder (encoding device for error correction) handles this information bit string by dividing into blocks for every m bits. Each block is called "data to send" and this data to send is denoted as $i=(i_1, \ldots, i_m)$.

The encoder outputs a codeword $w=(x_1, \ldots, x_n)$ of n bits ($n \geq m$) corresponding to the data to send i. That is, an n-m extra bit(s) (a redundant bit(s)) is added by this encoder. The n is called a code length, m is called a number of information bit, and this operation is called "encoding". The codeword sent out in a communication channel is called a transmitted word w, and the communication channel will output a received word v of n bits when the transmitted word w is inputted. Although the transmitted word=the received word if there is no influence of noise of transmission and/or a recording medium, etc., the transmitted word is usually subject to probabilistic changes because of noise. This is called an error and this situation is often expressed with v=w+e, which means an error e is added to the transmitted word in the communication channel. Here, when the j-th bit $w_j$ is changed into $w_j + e_j$, the e expresses a bit string $e=(e_1, \ldots, e_n)$, which is also called an error pattern. A decoder estimates which codeword was transmitted based on the received word v and outputs an estimate of the transmitted word w or estimate of the data i to send.

Note that although the codewords are sent out to an actual transmission path or recording medium as a signal wave form, which may, for example, be a series of pulses, where the pulse-null and pulse-exist represent the 0s and the 1s of the codeword w, respectively, concrete waveforms are not described for convenience of description in this specification.

Now, an encoding of the code length n and the number of information bits m is called an [n, m] encoding, and the resulting set of $2^m$ codewords is called an [n, m] code (See, for example, Japanese Laid-Open (Kokai) Patent Publication No. 2005-110251 and Japanese Patent No. 3281938.

More generally, a [n, m] linear error-correcting code over Galois field GF(q) is a m-dimensional linear subspace of $GF(q)^n$. GF(q) is a finite field with q elements. $GF(q)^n$ is a set of vectors (numerical vectors) obtained when n elements of GF(q) are arranged. The numerical vectors over GF(q) will be written as row vectors according to custom.

In the conventional encoding that utilizes a linear code, data is encoded as follows. First, define a basis of [n, m] linear error-correcting codes (hereinafter referred to as the linear code(s) C) as $(g_1, \ldots, g_m)$. A string of length m to be encoded is expressed by the following formula (13) as a numerical vector over GF(q). Note that there are various examples of the linear codes C, such as Hamming codes, BCH codes, and Goppa codes, which are described in standard textbooks for coding theory. (For example, "The Theory of Error-Correcting Codes," F. J. MacWilliams and N. J. A. Sloane, NORTH-HOLLAND, ISBN: 0-444-85193-3/0-444-85009-0/0-444-85010-4.)

$$x=(x_1, \ldots, x_m) \qquad (13)$$

In the following, such data will be referred to as a vector (of length m) or a vector of length m over GF(q). This is encoded into a vector f(x) belonging to the linear code C by the following formula (14). Of course, arithmetic is carried out in GF(q). For example, when q is a prime number, it is carried out with q numbers "0, 1, ..., q−1" and the mod-q arithmetic.

$$f(x) = \sum_{i=1}^{m} x_i g_i \qquad (14)$$

When $g_i=(g_{i1}, \ldots, g_{in})$ (i=1, ..., m), the following formula (15) is called a generator matrix of the linear code C:

$$G = \begin{bmatrix} g_{11} & \cdots & g_{1n} \\ \vdots & & \vdots \\ g_{m1} & \cdots & g_{mn} \end{bmatrix} \qquad (15)$$

Such a publicly known encoding is an [n, m] encoding as stated above, and specially in order to specifically designate an encoding, the above-mentioned encoding is referred to as [n, m] encoding designated by the generator matrix G. In this [n, m] encoding, the information of m digits are sent out using n digits (elements of GF(q)). A linear code C (that is, [n, m]

encoding designated by a generator matrix G) is used most often in the case of q=2. In this case, GF(q)={0, 1}. Note that in the case of q=2, "digits" are called a "bit." Also note that detailed examples of linear codes C and their generator matrices G are also variously described in the above-mentioned standard textbook for coding theory.

SUMMARY OF THE INVENTION

Although the publicly-known [n, m] codes stated above are sufficient in the ability of error correction, they have a problem in that they lack security since countermeasures against wiretapping in the course of transmission are imperfect. That is, when a third party has intercepted the word w transmitted over the communication channel or the received word v outputted from the communication channel, there is a problem that it is easy to estimate the original data i.

Accordingly, the present invention aims at providing an encoding device for error correction, encoding method for error correction and encoding program for error correction wherein security countermeasures are taken into account.

In accordance with an aspect of the present invention, there is provided an encoding device for error correction, the device comprising: a generation means for generating randomly a vector $u=(x_{k+1}, \ldots, x_m)$ composed of m-k digit(s); a creation means for creating an $x'=[xu]=(x_1, \ldots, x_m)$ by concatenating the vector $u=(x_{k+1}, \ldots, x_m)$ composed of m-k digit(s) randomly created by the creation means to data $x=(x_1, \ldots, x_k)$ to send; and an output means for outputting a vector of length n by carrying out [n, m] encoding of the x' created by the creation means.

In accordance with another aspect of the present invention, there is provided an encoding method for error correction, the method comprising the steps of: (a) generating randomly a vector $u=(x_{k+1}, \ldots, x_m)$ composed of m-k digit(s); (b) creating $x'=[xu]=(x_1, \ldots, x_m)$ by concatenating the vector $u=(x_{k+1}, \ldots, x_m)$ composed of m-k digit(s) randomly created by step (a) to data $x=(x_1, \ldots, x_k)$ to send; and (c) outputting a vector of length n by carrying out [n, m] encoding of the x' created by step (b).

In accordance with another aspect of the present invention, there is provided a computer-readable storage medium having an encoding program for error correction stored thereon that is executable by a computer, the program comprising the steps of: (a) generating randomly a vector $u=(x_{k+1}, \ldots, x_m)$ composed of m-k digit(s); (b) creating $x'=[xu]=(x_1, \ldots, x_m)$ by concatenating the vector $u=(x_{k+1}, \ldots, x_m)$ composed of m-k digit(s) randomly created by step (a) to data $x=(x_1, \ldots, x_k)$ to send; and (c) outputting a vector of length n by carrying out [n, m] encoding of the x' created by step (b).

In accordance with another aspect of the present invention, there is provided an encoding device for error correction, the device comprising: a first encoding means for encoding data to send into a following vector of length N' by [[N', K']] encoding designated by an M'×N' generator matrix F on Galois field GF(q), $$y=(y_1^{(1)}, \ldots, y_{k_1}^{(1)}, y_1^{(2)}, \ldots, y_{k_2}^{(2)}, \ldots, y_1^{(N)}, \ldots, y_{k_N}^{(N)}) \quad (16);$$

a second encoding means for encoding, for i=1, ..., N, $$(y_1^{(i)}, \ldots, y_{k_i}^{(i)}) \quad (17)$$

into the following vector of length $n_i$ by $[[n_i, k_i]]$ encoding designated by a generator matrix $G_i$, $$w^{(i)}=(w_1^{(i)}, \ldots, w_{n_i}^{(i)}) \quad (18);$$

and an output means for outputting $[w^{(1)} \ldots w^{(N)}]$ obtained by concatenating $w^{(1)}, \ldots, w^{(N)}$ as an encoded result.

In accordance with another aspect of the present invention, there is provided an encoding method for error correction, the method comprising the steps of: (a) encoding data to send into the following vector of length N' by [[N', K']] encoding designated by an M'×N' generator matrix F on Galois field GF(q), $$y=(y_1^{(1)}, \ldots, y_{k_1}^{(1)}, y_1^{(2)}, \ldots, y_{k_2}^{(2)}, \ldots, y_1^{(N)}, \ldots, y_{k_N}^{(N)}) \quad (19);$$

(b) encoding, for i=1, ..., N, $$(y_1^{(i)}, \ldots, y_{k_i}^{(i)}) \quad (20)$$

into the following vector of length $n_i$ by $[[n_i, k_i]]$ encoding designated by a generator matrix $G_i$, $$w^{(i)}=(w_1^{(i)}, \ldots, w_{n_i}^{(i)}) \quad (21);$$

and (c) outputting $[w^{(1)} \ldots w^{(N)}]$ obtained by concatenating $w^{(1)}, \ldots, w^{(N)}$ as an encoded result.

In accordance with another aspect of the present invention, there is provided a computer-readable storage medium having an encoding program for error correction stored thereon that is executable by a computer, the program comprising the steps of: (a) encoding data to send into the following vector of length N' by [[N', K']] encoding designated by an M'×N' generator matrix F on Galois field GF(q), $$y=(y_1^{(1)}, \ldots, y_{k_1}^{(1)}, y_1^{(2)}, \ldots, y_{k_2}^{(2)}, \ldots, y_1^{(N)}, \ldots, y_{k_N}^{(N)}) \quad (22);$$

(b) encoding, for i=1, ..., N, $$(y_1^{(i)}, \ldots, y_{k_i}^{(i)}) \quad (23)$$

into the following vector of length $n_i$ by $[[n_i, k_i]]$ encoding designated by a generator matrix $G_i$, $$w^{(i)}=(w_1^{(i)}, \ldots, w_{n_i}^{(i)}) \quad (24);$$

and (c) outputting $[w^{(1)} \ldots w^{(N)}]$ obtained by concatenating $w^{(1)}, \ldots, w^{(N)}$ as an encoded result.

In accordance with another aspect of the present invention, the device for error correction encoding according to the above mentioned device, wherein the device further comprises a second output means for outputting information that is outputted from the output means after encrypting with a function g expressing any encrypting system is provided.

In accordance with another aspect of the present invention, the encoding method for error correction according to the above mentioned method, wherein the method further comprises the step of: (d) outputting information that is outputted from step (c) after encrypting with a function g expressing any encrypting system, is provided.

In accordance with another aspect of the present invention, there is provided a computer-readable storage medium have an encoding program for error correction stored thereon that is executable by a computer, the program comprising the steps of: (a) generating randomly a vector $u=(x_{k+1}, \ldots, x_m)$ composed of m-k digit(s); (b) creating $x'=[xu]=(x_1, \ldots, x_m)$ [[x'[xu]=(x_1, \ldots, x_m)]] by concatenating the vector $u=(x_{k+1}, \ldots, x_m)$ composed of m-k digit(s) randomly created by step (a) to data $x=(x_1, \ldots, x_k)$ to send; (c) outputting a vector of length n by carrying out [n, m] encoding of the x' created by step (b); and (d) outputting information that is outputted from step (c) after encrypting with a function g expressing any encrypting system.

In accordance with another aspect of the present invention, the encoding device for error correction according to the above mentioned device, wherein the device further comprises a second output means for outputting information that is outputted from the output means after encrypting with a function g expressing any encrypting system is provided.

In accordance with another aspect of the present invention, the encoding method for error correction according to the above mentioned method, wherein the method further comprises the steps of: (d) outputting information that is outputted from step (c) after encrypting with a function g expressing any encrypting system, is provided.

In accordance with another aspect of the present invention, there is provided a computer-readable storage medium having a program for error correction encoding stored thereon that is executable by a computer, the program comprising: (a) encoding data to send into the following vector of length N' by [[N', K']] encoding designated by an M'×N' generator matrix F on Galois field GF(q), $$y=(y_1^{(1)},\ldots,y_{k_1}^{(1)},y_1^{(2)},\ldots,y_{k_2}^{(2)},\ldots,y_1^{(N)},\ldots,y_{k_N}^{(N)}) \quad (25);$$

(b) encoding, for i=1, . . . , N, $$(y_1^{(i)},\ldots,y_{k_i}^{(i)}) \quad (26)$$

into a following vector of length $n_i$ by $[[n_i, k_i]]$ encoding designated by a generator matrix $G_i$ $$w^{(i)}=(w_1^{(i)},\ldots,w_{n_i}^{(i)}) \quad (27);$$

(c) outputting $[w^{(1)} \ldots w^{(N)}]$ obtained by concatenating $w^{(1)}, \ldots, w^{(N)}$ as an encoded result; and (d) outputting information that is outputted from step (c) after encrypting with a function g expressing any encrypting system.

For the sake of description convenience, assume that an [[n, k]] code is a [[4, 1]] code and data to send is {0, 1}, in addition "0" in the data to send is encoded into {0000, 1111} and "1" in the data to send is encoded into {0011, 1100}, for example. In the present invention, any one pattern in the { } is selected randomly and transmitted at the time of transmission. For example, since the patterns of data "0" are "0000" and "1111", one of these patterns will be transmitted randomly. By doing it in this way, the original data cannot be estimated even if a third party in the course of transmission could intercept a part of the pattern. This is because even if the third party could intercept "00", for example, this "00" is included also in the patterns of data "1".

Therefore, according to the present invention, an encoding device for error correction, encoding method for error correction and encoding program for error correction wherein security countermeasures are taken into account are provided.

DETAILED DESCRIPTION OF THE PREFERRED EMBODIMENTS

Hereinafter, the preferred embodiments of the present invention are described.

First, as for definitions of terms, a vector $(x_1, \ldots, x_a, y_1, \ldots, y_b)$ of length a+b that is obtained by linking a vector $x=(x_1,\ldots,x_a)$ of length a and a vector $y=(y_1,\ldots,y_b)$ of length b will be expressed by [xy]. In this case, the situation is described as the y is concatenated to the x and the [xy] is obtained. Three or more vectors can also be enclosed by "[" and "]", and the expression which is enclosed denotes a concatenated vector. For example, [xyz] expresses a vector which is obtained by concatenating y to x and further z to the resulting [xy]. Namely, [xyz]=[[xy]z]=[x[yz]].

A. First Embodiment

Figure 1:
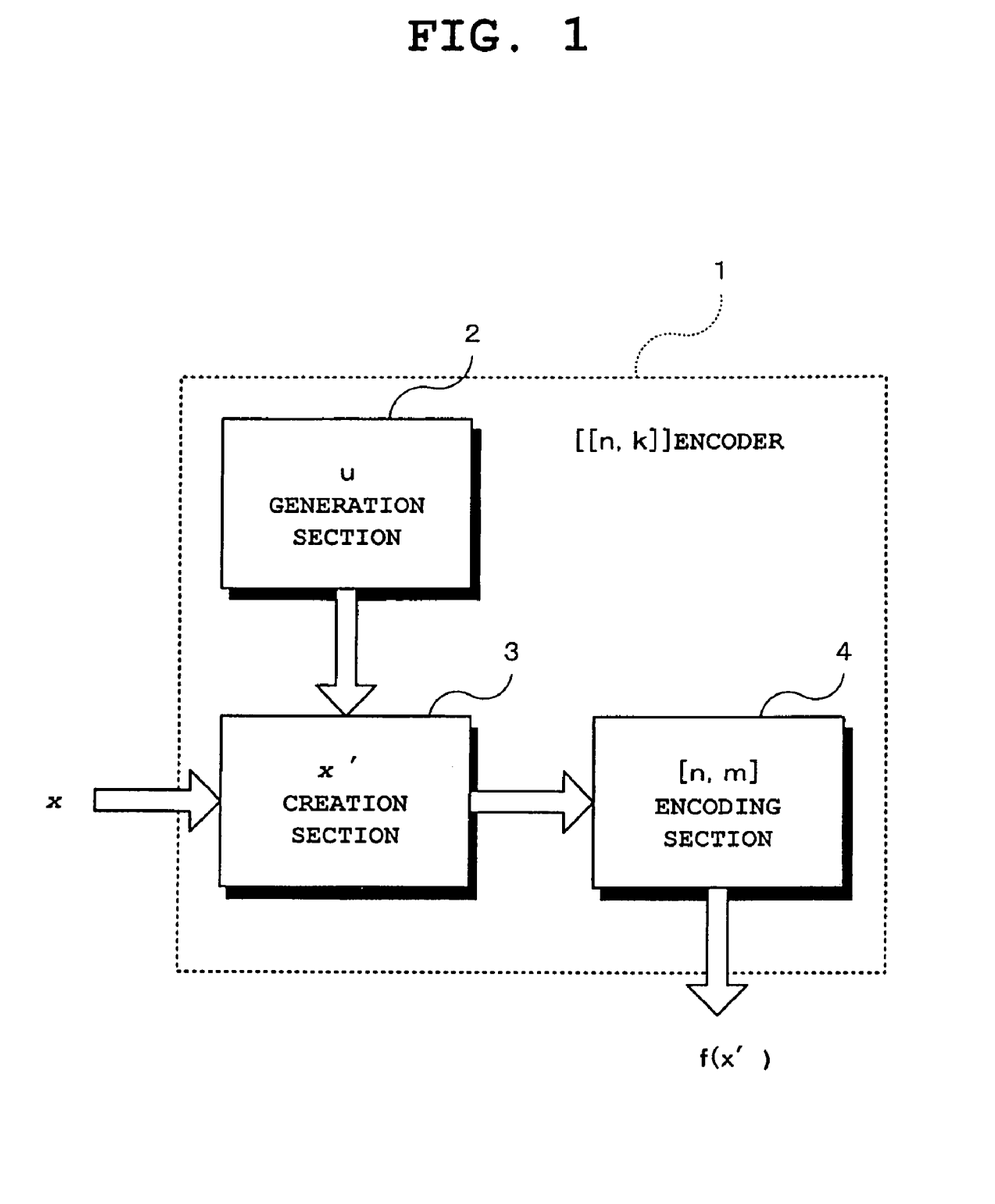
FIG. 1 shows a conceptual block diagram of a first embodiment ([[n, k]] encoding)

FIG. 1 shows a conceptual block diagram of a first embodiment ([[n, k]] encoding). This block expresses schematically what can be used as the encoder in the communication system model (FIG. 3) explained in the beginning. Detailed compositions of this block are not referred to in particular. For example, this block may be composed of hardware. In any case, this block has only to realize the functions explained below.

The name of the illustrated whole block may be called an encoder, for example, like in the communication model in the beginning. However, here, in order to differentiate the present invention from the [n, m] encoding of the conventional prior art, it is referred to as an [[n, k]] encoding section 1 by using double brackets, and further encoding by this [[n, k]] encoding section 1 as [[n, k]] encoding.

The [[n, k]] encoding section 1 at least comprises a u generation section 2, an x' creation section 3, and an [n, m] encoding section 4. The u generation section 2 is, for example, a physical random number generator or pseudorandom number generator, and the [n, m] encoding section 4 carries out operations equivalent to the [n, m] encoding of conventional prior art.

According to this first embodiment, in order to secure the security of information, the following novel encoding is carried out. Simply speaking, this encoding will encode information of k digit(s) by using the publicly known [n, m] encoding explained above where k≦m.

Now, let the data x to send be denoted as in the following formula (28):

$$x=(x_1,\ldots,x_k) \quad (28)$$

The x' creation section 3 concatenates this data x and a vector $u=(x_{k+1},\ldots,x_m)$ composed of m-k digit(s) generated randomly at the u generation section 2, then an x' of the following formula (29) is obtained:

$$x'=[xu]=(x_1,\ldots,x_m) \quad (29)$$

The [n, m] encoding section 4 encodes x' calculated in the x' creation section 3 into a vector f(x') of length n by using the [n, m] encoding designated by the aforementioned generator matrix G.

Thus, in this first embodiment, the data x to send is concatenated with the vector $u=(x_{k+1},\ldots,x_m)$ composed of m-k digit(s) generated randomly, resulting in the creation of the x', the x' is encoded into the vector f(x') of length n by using the [n, m] encoding, and this vector f(x') is outputted.

The encoding in this first embodiment is the [[n, k]] encoding as stated above. Since encoding of some different sorts is obtained by modifying the generator matrix G in order to specifically designate the specific encoding, it is referred to as the [[n, k]] encoding designated by the generator matrix G. The concept of this [[n, k]] encoding can be shown as in the following formula (30):

$$\underset{[n,m]\ ENCODING}{\underbrace{x \to \overset{[[n,k]]\ ENCODING}{\overbrace{x' \to f(x')}}}} \quad (30)$$

The whole formula (30) corresponds to the [[n, k]] encoding section 1 in FIG. 1. The part of x→x' corresponds to the x' creation section 3, and the part of x→f(x') corresponds to the [n, m] encoding section 4.

Here, it is explained that the example given in the section of the SUMMARY OF THE INVENTION is realized by the [[n, k]] encoding of this first embodiment. Let $(g_1, \ldots, g_m)$ be a basis of the linear code C, and B be the subspace spanned by $(g_{k+1}, \ldots, g_m)$, where n=4, k=1 and m=2. Thereby, a specific example of the linear code C can be obtained as in the following formula (31), and B can be expressed as in the following formula (32). Note that we assume GF(q)=GF(2) here.

$$C=\{(0,0,0,0), (1,1,1,1), (0,0,1,1), (1,1,0,0)\} \quad (31)$$

$$B=\{(0,0,0,0), (1,1,1,1)\} \quad (32)$$

In this case, $g_1$ and $g_2$ can be expressed in the following formulas (33) and (34). Then, as expressed in the following formula (35), since $x_2=0$, 1 is generated randomly in the u generation section 2, according to whether the data $x_1=0$ or $x_1=1$ to send is, the output from the [[n, k]] encoder 1 will be $\{0000, 1111\}$ or $\{1100, 0011\}$. Note that the vector $(1, 1, 1, 1)$ is written as "1111" here, and so on.

Formulas (33) thru (35) are as follows:

$$g_1=(1, 1, 0, 0) \quad (33)$$

$$g_1=(1, 1, 1, 1) \quad (34)$$

$$f(x)=x_1(1,1,0,0)+_2(1,1,1) \quad (35)$$

Thus, in this first embodiment, the data to send x is concatenated with the vector $u=(x_{k+1}, \ldots, x_m)$ composed of m-k digit(s) randomly generated, resulting in the creation of the x'. The x' is encoded into the vector f(x') of length n by using the [n, m] encoding. Since the information of k digit(s) can be created and outputted, the security of information is securable from the following reasons.

Now, for the sake of simplification, assume that the [[n, k]] code is a [[4, 1]] code, as described above, and the data to send is $\{0, 1\}$. In this case, according to the first embodiment, for example, "0" in the data to send is encoded into $\{0000, 1111\}$ and "1" in the data to send is encoded into $\{0011, 1100\}$, and any one pattern in the $\{\}$ is selected randomly and transmitted at the time of transmission. For example, since the patterns of data "0" are "0000" and "1111", one of these patterns will be chosen randomly and transmitted. The original data cannot be estimated even if a third party in the course of transmission could intercept a part of the pattern. This is because even if the third party could intercept "00", for example, this "00" is included also in the patterns of data "1".

Therefore, in the encoding of this first embodiment ([[n, k]] encoding), since the eavesdropping by the third party in the course of transmission can be prevented effectively and security countermeasures can be taken into account, the abovementioned problem to be solved can be achieved.

B. Second Embodiment

In the encoding of the first embodiment described above (the [[n, k]] encoding), it is useful in that security countermeasures can be taken. On the other hand, while it is understood that a comparatively longer code length is advantageous with respect to the probability of decoding error and security from theoretical analysis, the complicatedness of the procedures of encoding or decoding increases as the code length becomes longer, and the complicatedness of these procedures may become an obstacle for practical use. Since the [[n, k]] encoding has a remarkable useful merit in that eavesdropping over a communication channel can be avoided as stated above which is not obtainable by the conventional prior art, the obstacle factor (the complicatedness of procedures) is a technical problem which must be overcome by all means. The second embodiment described below provides a means for that. Briefly speaking, this second embodiment handles the process of the [[n, k]] encoding having large code length after dividing it into several processes by employing the way of thinking of Divide and Conquer (This is a method of breaking down a given problem into several small problems, solving these small problems, governing solutions to the small problems, and obtaining a solution to the given problem.). By this, the aforementioned obstacle factor is overcome, and a technique for error correction encoding that is fully useful for industrial use is provided.

Hereinafter, the second embodiment will be explained in detail. This second embodiment discloses as an example an encoding that uses two linear codes as follows. Hereinafter, this encoding is referred to as "two-step encoding".

In this two-step encoding, where $N>0$ and $n_i \geq m_i \geq k_i \geq 0$ (i=1, ..., N) are integers (the case where $n_i$, $m_i$, and $k_i$ do not depend on i is practical), an [[$n_i$, $k_i$]] encoding designated by an $m_i \times n_i$ generator matrix $G_i$ and an [[N', K']] encoding designated by M'×N' generator matrix F over GF(q) are combined and carried out. This is called [[N", K"]] encoding where N' and N" are given by the following formula (36):

$$N' = \sum_{i=1}^{N} k_i,$$
$$N'' = \sum_{i=1}^{N} n_i \quad (36)$$

The details of the [[N', K']] encoding is as follows. Here, the length of the data to send is K'.

Figure 2:
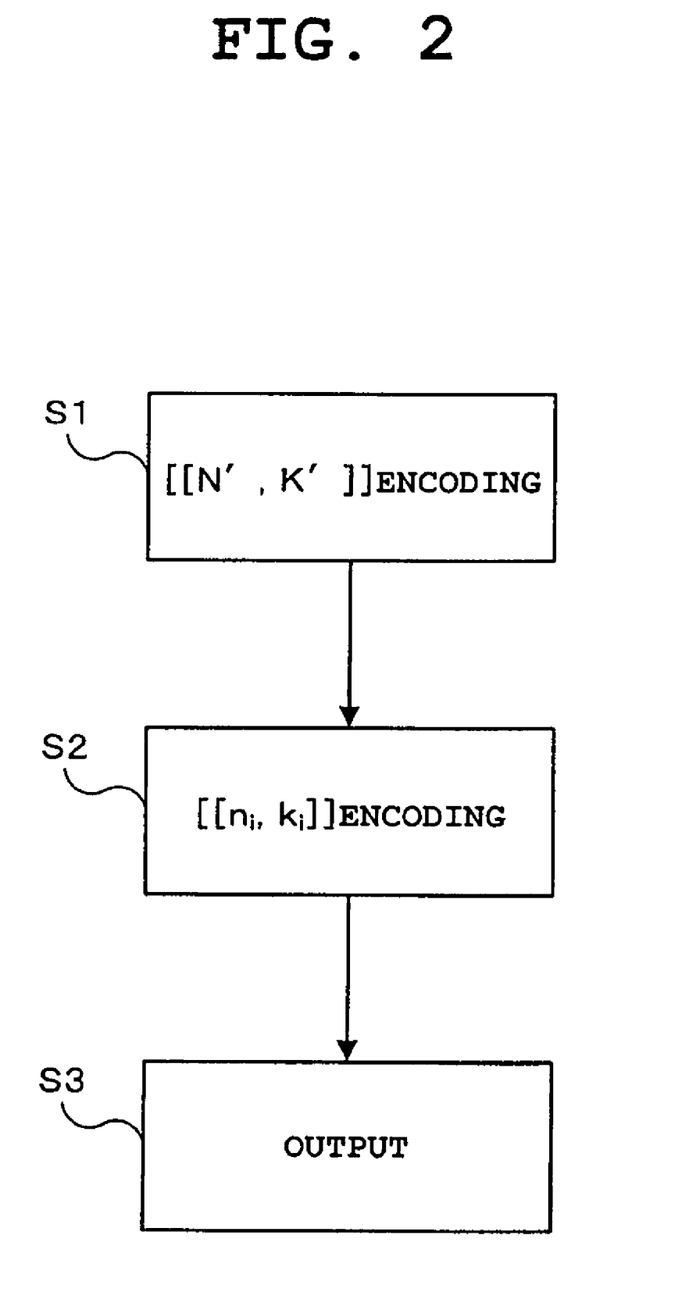
FIG. 2 shows a conceptual process flow of a second embodiment (two-step encoding)

FIG. 2 shows a conceptual process flow according to the second embodiment (two-step encoding). This process flow expresses schematically what can be used as the encoder in the model figure (FIG. 3) of the communication system explained in the beginning. Like the first aforementioned embodiment, this process flow may be composed of hardware or may be composed in whole or in part of software that can be executed by a computer. In any case, this process flow has only to realize the functions explained below.

First, in this process flow, in [[N', K']] encoding of Step S1, any data to send is encoded into a vector of length N' by [[N', K']] encoding designated by an M'×N' generator matrix F over GF(q). This vector can be broken down into N blocks, and can be written as the following formula (37):

$$y=(y_1^{(1)}, \ldots, y_{k_1}^{(1)}, y_1^{(2)}, \ldots, y_{k_2}^{(2)}, \ldots, y_1^{(N)}, \ldots, y_{k_N}^{(N)}) \quad (37)$$

Next, in [[$n_i$, $k_i$]] encoding of Step S2, for i=1, ..., N, $$(y_1^{(i)}, \ldots, y_{k_i}^{(i)}) \quad (38)$$

is encoded into a vector of length $n_i$ by [[$n_i$, $k_i$]] encoding designated by the generator matrix $G_i$ as follows:

$$w^{(i)}=(w_1^{(i)}, \ldots, w_{n_i}^{(i)}) \quad (39)$$

Finally, in the last Step S3, $[w^{(1)} \ldots w^{(N)}]$, which is obtained by concatenating $w^{(1)}, \ldots, w^{(N)}$, is outputted as an encoded result.

Here, regarding codes used in Step S1, what is specially useful is a code when [[N', K']] encoding designated by the M'×N' generator matrix F over GF(q) originates from a code over extended field $GF(q^k)$ of GF(q). In this case, for example, a Reed-Solomon code over $GF(q^k)$ can be used. Practically, an [N, K] Reed-Solomon code over $GF(q^k)$ is used as a [kN, kK] code over GF(q). For example, it is a Reed-Solomon code or the like which is used for compact discs (q=2).

Namely, in the [[N', K']] encoding in Step S1, although [N', M'] encoding corresponding to conventional [n, m] encoding can be used, an [N, M] code over $GF(q^k)$ can be used as a [kN, kM] code over GF(q) in this part, where N'=kN and M'=kM.

Note that this is obtained by expressing an element of $GF(q^k)$ as a vector of length k over GF(q). Concretely, it is as follows. Now, let a basis of $GF(q^k)$ that is a linear space over GF(q) be $b=(\beta_j)_{j=1}^k$. Since it is possible to write any element $\xi \in GF(q^k)$ as in the following formula (40) using b, the row vector $(x_1, \ldots, x_k)$ of the numbers obtained in this way is denoted by $\phi(\xi)$.

$$\xi = x_1\beta_1 + \ldots + x_k\beta_k \quad (40)$$

With a correspondence "$[[\xi=]](\xi_1, \ldots, \xi_N) \leftarrow \rightarrow [\phi(\xi_1) \ldots \phi(\xi_N)]$" using the conversion "$\rightarrow \phi(\xi)=(x_1, \ldots, x_k)$", the vector $(\xi_1, \ldots, \xi_N)$ of length N over $GF(q^k)$ can be identified with the vector $[\phi(\xi_1) \ldots \phi(\xi_N)]$ of length kN over GF(q).

A detailed example of the two-step encoding is explained. An example when $n_i$, $m_i$, and $k_i$ do not depend on i, that is, when $n_i=n$, $m_i=m$ and $k_i=k$ (i=1, ..., N) is shown where $n \geq m \geq k \geq 0$ are integers. In the above-mentioned Step S1, the [kN, kM] encoding that was mentioned above is used. For example, if q=2 and k=4, [4·15, 4M] encoding by a Reed-Solomon code can be used where $0 < M \leq 15$. In this case, in the above-stated Step S1, the following formula (41) is obtained:

$$y=(y_1^{(1)}, \ldots, y_k^{(1)}, y_1^{(2)}, \ldots, y_k^{(2)}, \ldots, y_1^{(N)}, \ldots, y_k^{(N)}) \quad (41)$$

In Step S2, [[n, k]] encoding designated by the same generator matrix G may be applied to $y_1^{(i)}, \ldots, y_k^{(i)}$ (i=1, ..., N). For example, where n=6, as in the following formulas (42) through (46), [[6, 4]] encoding designated by the generator matrix G in which i-th row is $g_i$ is carried out. Thus, the output of [[6, 4]] encoding designated by the generator matrix G is a vector whose Hamming weight is even. Formulas (42)-(46) are:

$$g_1=(1,1,0,0,0,0) \quad (42)$$

$$g_2=(1,0,1,0,0,0) \quad (43)$$

$$g_3=(1,0,0,1,0,0) \quad (44)$$

$$g_4=(1,0,0,0,1,0) \quad (45)$$

$$g_5=(1,1,1,1,1,1) \quad (46)$$

Note that the reason why the code over the extended-field $GF(q^k)$ is handled in the above description is that it can carry out efficient decoding by using it. However, the above description is only an illustration of the best (best mode) embodiments in performance. Therefore, the present invention is not restricted to the case that uses the code over the extended-field $GF(q^k)$.

In the second embodiment as above, since the process of the [[n, k]] encoding having large code length is carried out after dividing it into several processes by employing the way of thinking of Divide and Conquer, the procedure for encoding or decoding can be carried out efficiently and the procedure is simplified. Therefore, the advantage of the [[n, k]] encoding of the first embodiment described previously (security countermeasures against wiretapping) can be employed efficiently. In addition, the disadvantage (complicatedness of the procedure for encoding or decoding) resulting from the long code length of the [[n, k]] encoding can be solved, and the technique for error correction coding that is useful in practical use can be provided.

This second embodiment is directed to the two-step encoding. However, not only two steps but three or more steps for encoding may be used. This is because three or more step encoding comprises the two-step encoding in part of the procedure. Therefore, the essential matters for this invention reside in the part concerning two-step encoding (Steps S1 and S2 in FIG. 2).

The first embodiment is directed to the [[n, k]] encoding and the second embodiment is directed to the two-step encoding. These two embodiments can be constructed very simply by making the conventional [n, m] encoding a black-box, for example as presented in the previous formula (30). A supplement for this is the following formula (47):

(47)

This formula (47) ultimately shows that the two embodiments perform functions only for processing information before feeding it into "the communication channel or the storage device".

Incidentally, descriptions about the "decoder" will be shown in the following formula, which are not essential for the present invention. The content of the decoder used by the two embodiments can be generally expressed as the following formula (48):

$$\text{DECODING FOR PUBLICLY KNOWN } [n, m] \text{ ENCODING} \rightarrow [\hat{x}\hat{u}] \rightarrow \hat{x} \quad (48)$$

Here, the estimates of x and u are given by the following formula (49), respectively.

$$\hat{x}, \hat{u} \quad (49)$$

From the above, since the two-step encoding can also be expressed as the following formula (50) as a whole, the decoding principle of the formula (48) is applicable:

$$x \rightarrow x' \rightarrow f(x') \quad (50)$$

Note that, from the viewpoint of efficiency, it is desirable to apply decoding of two steps corresponding to two-step encoding. This is similar to decoding of publicly known two-step encoding, namely, a concatenated code.

In the first embodiment, the [n, m] encoding of the [n, m] encoding section 4 is described as "designated by the generator matrix G". However, this is not restricted to the generator matrix G of any specific code mentioned as an example. Namely, any generator matrix of an [n, m] linear code can be used as G. This is true for the two-step encoding in the second embodiment.

The exploitation modes of the present invention must not be restrictively understood by the above formula (47). That is, although the above formula (47) may straightly induce you to imagine only the simplest exploitation mode that feeds the output f(x') of [[n,k]] encoding into the communication channel or storage device, this mode only shows an example of exploitation modes of the present invention.

For example, with the aim of further increasing encryption strength, it is also a realizable exploitation mode which uses this mode together with another encryption system. This combination configuration is explained below. Now, let a function g express the encrypting system being used together. In this mode, the above-stated f(x') is encrypted into g(f(x')). Since the encryption strength of f(x') is further reinforced with g, it can be considered as a more practically desirable powerful encrypting system. The g(f(x')) may be further processed by any other information processing before putting it into the communication channel or the storage device. Note that although a form of $g=g_K$ is used as notation in many cases since the g is generally dependent on an encryption key K in the above description, the function expressing the encrypting system used in combination is expressed simply by g for the sake of simplification. Therefore, this g also comprises the form of $g=g_K$.

Thus, the above formula (47) ultimately indicates that the two embodiments perform functions only for processing information, which may be combined with any other information processing, before feeding it into "the communication channel or the storage device".

The encoding function for error correction concerning the above-stated embodiments may be realized by storing a program in the internal memory or the external memory (recording medium) of a computer.

Furthermore, although the computer program product of the encoding device for error correction which is a preferred embodiment of the present invention is stored in the memory (for example, ROM, etc.) of the device, this processing program is stored on a computer-readable medium and should also be protected in the case of manufacturing, selling, etc. of only the program. In that case, the method of protecting the program with a patent will be realized by the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. An encoding device for error correction, said device comprising:
   generation means for generating randomly a vector $u=(x_{k+1}, \ldots, x_m)$ composed of m-k digit(s);
   creation means for creating a modified data $x'=[xu]=(x_1, \ldots, x_m)$ by concatenating the vector $u=(x_{k+1}, \ldots, x_m)$ to an original data $x=(x_1, \ldots, x_k)$ to be sent; and
   first output means for outputting a vector f(x') of length n by carrying out an [n, m] encoding f of the modified data x',
   wherein the integer "n" is the code length, the integer "m" is the number of information digit(s) regarding the [n,m] encoding f, and the integer "k" is the length of the original data x, where $k<m \leqq n$.

2. The encoding device according to claim 1, the device further comprising second output means for outputting information that is outputted from the first output means after encrypting with a function g expressing any encrypting system.

3. An encoding method for error correction using a hardware, the method comprising the steps of:
   (a) generating randomly a vector $u=(x_{k+1}, \ldots, x_m)$ composed of m-k digit(s);
   (b) creating a modified data $x'=[xu]=(x_1, \ldots, x_m)$ by concatenating the vector $u=(x_{k+1}, \ldots, x_m)$ to an original data $x=(x_1, \ldots, x_k)$ to be sent; and
   (c) outputting a vector f(x') of length n by carrying out an [n, m] encoding f of the modified data x',
   wherein the integer "n" is the code length, the integer "m" is the number of information digit(s) regarding the [n,m] encoding f, and the integer "k" is the length of the original data x, where $k<m \leqq n$.

4. The encoding method according to claim 3, the method further comprising the step of (d) outputting information that is outputted from the step (c) after encrypting with a function g expressing any encrypting system.

5. A non-transitory computer-readable storage medium having an encoding program for error correction stored thereon that is executable by a computer, the program comprising the steps of:
   (a) generating randomly a vector $u=(x_{k+1}, \ldots, x_m)$ composed of m-k digit(s);
   (b) creating a modified data $x'=[xu]=(x_1, \ldots, x_m)$ by concatenating the vector $u=(x_{k+1}, \ldots, x_m)$ to an original data $x=(x_1, \ldots, x_k)$ to be sent; and
   (c) outputting a vector f(x') of length n by carrying out an [n, m] encoding f of the modified data x',
   wherein the integer "n" is the code length, the integer "m" is the number of information digit(s) regarding the [n,m] encoding f, and the integer "k" is the length of the original data x, where $k<m \leqq n$.

6. The non-transitory computer-readable storage medium having the encoding program according to claim 5, the program further comprising the step of (d) outputting information that is outputted from the step (c) after encrypting with a function g expressing any encrypting system.

* * * * *

UNITED STATES PATENT AND TRADEMARK OFFICE
CERTIFICATE OF CORRECTION

PATENT NO. : 8,176,393 B2
APPLICATION NO. : 11/898261
DATED : May 8, 2012
INVENTOR(S) : Mitsuru Hamada It is certified that error appears in the above-identified patent and that said Letters Patent is hereby corrected as shown below:

In the Specification:

Col. 7, line 23, change "$g_1=(1,1,1,1)$" to --$g_2=(1,1,1,1)$--.

Col. 7, line 25, change "$f(x)=x_1(1,1,0,0)+_2(1,1,1)$" to --$f(x)=x_1(1,1,0,0)+x_2(1,1,1,1)$--.

Col. 9, lines 14-17, change "With a correspondence "[[$\xi$=]] ($\xi_1$, ..., $\xi_N$)$\leftarrow\rightarrow[\varphi(\xi_1)...\varphi(\xi_N)]$" using the conversion "$\rightarrow\varphi(\xi)=(x_1,...,x_k)$", the" to --With a correspondence "($\xi_1$, ..., $\xi_N$)$\leftarrow\rightarrow[\varphi(\xi_1)...\varphi(\xi_N)]$" using the conversion "$\xi\rightarrow\varphi(\xi)=(x_1,...,x_k)$", the--.

In the Claims:

Col. 11, Claim 1, lines 40-41, change "An encoding device for error correction, said device comprising:" to --An encoding device for error correction, the device comprising:--.

Signed and Sealed this
Twenty-sixth Day of July, 2016

Michelle K. Lee
*Director of the United States Patent and Trademark Office*